July 2, 1968  W. H. SCIDMORE  3,390,935
WIDE ANGLE EYEPIECE
Filed April 9, 1965
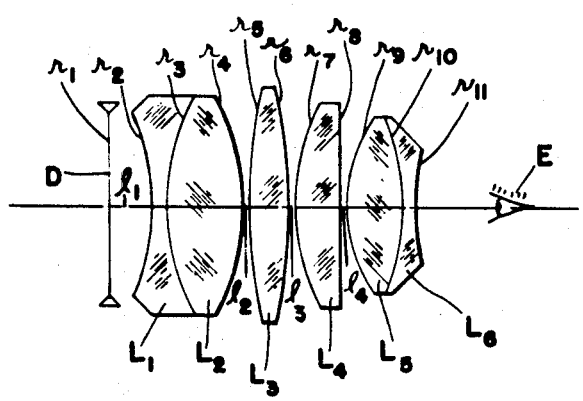
Inventor
WRIGHT H. SCIDMORE

United States Patent Office 3,390,935
Patented July 2, 1968

---

3,390,935
WIDE ANGLE EYEPIECE
Wright H. Scidmore, Langhorne, Pa., assignor to the United States of America as represented by the Secretary of the Army
Filed Apr. 9, 1965, Ser. No. 447,112
1 Claim. (Cl. 350—206)

ABSTRACT OF THE DISCLOSURE

A wide angle eyepiece having an apparent field of view of about 80°, said eyepiece comprising, from the objective to the eyepiece; a diaphragm, a cemented doublet field lens, two singlet center lenses and a cemented doublet eyelens.

---

The invention described herein may be manufactured and used by or for the Government for governmental purposes without the payment to me of any royalty thereon.

This invention relates to eyepieces and more particularly concerns such optical devices providing an apparent field coverage in the neighborhood of 80° or so and having good correction qualities over the entire field.

The principal object of the invention is to provide eyepieces as aforementioned.

Another object of the invention is to provide eyepieces wherein the number of different lens radii is held to an absolute minimum thereby simplifying manufacturing procedures and lowering production costs.

The exact nature of this invention as well as other objects and advantages thereof will be readily apparent from consideration of the following specification and single figure of the drawing which illustrates a diagrammatic embodiment of my inventive device in axial section.

Briefly, the present invention is based on the discovery that by judiciously axially disposing optical components, an efficient, compact, wide angle eyepiece is provided possessing good correction qualities over its entire field of view.

More specifically, my present invention resides in a wide angle eyepiece commonly known as the 2–1–1–2 type and, from front to rear, or from the objective to the eyepiece, consists of a diaphragm, a cemented doublet field lens, two singlet center lenses and a cemented doublet eyelens.

TABLE I.—OPTICAL LEGEND

L—the individual lens
r—the radius of curvature
d—axial thickness of lens
l—air space
n—refractive index
V—Abbe number of the glass
F—total focal length of the eyepiece
$f_1$ and $_2$—focal length of cemented doblet, $L_1$–$L_2$
$f_3$—foscal length of lens $L_3$
$f_4$—focal length of lens $L_4$
$f_5$ and $_6$—focal length of cemented doublet, $L_5$–$L_6$
C.A.—Clear aperture

TABLE II.—LENS TABLE DATA

| Element | Radii | Axial Thicknesses | Air Space Thicknesses | $n_\mathrm{d}$ | V | C.A. |
|---|---|---|---|---|---|---|
| D | $r_1 = \infty$ | | $l_1 = .326$ | | | C.A.$_\mathrm{D}$=1.568 |
| | $r_2 = -1.875$ | $d_1 = .133$ | | $n_1 = 1.649$ | $V_1 = 33.8$ | C.A.$_1 = 1.446$ |
| $L_1, L_2$ | $r_3 = +1.875$ | $d_2 = .639$ | | $n_2 = 1.620$ | $V_2 = 60.3$ | |
| | $r_4 = 1,875$ | | $l_2 = .009$ | | | C.A.$_2 = 1.792$ |
| | $r_5 = +4.766$ | | | | | |
| $L_3$ | $r_6 = -4.766$ | $d_3 = .337$ | | $n_3 = 1.620$ | $V_3 = 60.3$ | C.A.$_3 = 1.858$ |
| | $r_7 = +1.875$ | | $l_3 = .009$ | | | |
| $L_4$ | $r_8 = \infty$ | $d_4 = .399$ | | $n_4 = 1.620$ | $V_4 = 60.3$ | C.A.$_4 = 1.758$ |
| | $r_9 = +1.346$ | | $l_4 = .009$ | | | |
| $L_5, L_6$ | $r_{10} = -2.018$ | $d_5 = .461$ | | $n_5 = 1.620$ | $V_5 = 60.3$ | C.A.$_5 = 1.436$ |
| | $r_{11} = +2.808$ | $d_6 = .107$ | | $n_6 = 1.649$ | $V_6 = 33.8$ | C.A.$_6 = 1.001$ |

Equivalent focal length, $F = 1.000''$, $f_1$ and $_2 = 39.9F$, $f_3 = 3.90F$, $f_4 = 3.02F$, $f_5$ and $_6 = 3.93F$.

---

Referring now to the drawing, a diaphragm D functions as a field stop to aid in limiting the apparent field of view of my device to a desirably wide angle of about 80°.

Approaching eye E from diaphragm D is a field lens consisting of an equi-concave lens $L_1$ cemented to an equi-convex lens $L_2$ such that $r_2 = -r_3 = r_4$. The focal length of this field lens $L_1$ and $L_2$ is approximately 39.9 F. Proceeding still rearwardly, or toward the eye E, an equi-convex singlet center lens $L_3$, where $r_5 = -r_6$, has a focal length of about 3.90 F. Adjacent thereto is a convex-plano singlet center lens $L_4$, where $r_7 = -r_2 = r_3 = -r_4$, its focal length approximating 3.02 F. The optical component nearest the eye E is a cemented doublet consisting of bi-convex lens $L_5$ cemented to a bi-concave lens $L_6$. Positive radius $r_9$ of the lens $L_5$ is about 0.667 times that of a negative radius $r_{10}$ and 0.479 times smaller than $r_{11}$. Cemented doublet $L_5$–$L_6$ has a focal length in the neighborhood of about 3.93 F.

Positive refracting power lenses $L_2$, $L_3$, $L_4$ and $L_5$ are made conveniently of 620/603 glass whereas negative lenses $L_1$ and $L_6$ can be ground from 649/338 glass.

The Petzval curvature or sum my eyepiece is 0.492 F, the Petzval radius being 2.033 F.

I claim:

1. A wide angle eyepiece comprising, axially from front to rear,
    a diaphragm function as a field stop to aid in limiting apparent field of view to about 80°,
    a cemented doublet field lens,
    a pair of singlet center lenses and,
    a cemented doublet eyelens,
    said eyepiece conforming substantially to the following table in which dimensions are in terms of inches and proceeding from front to rear, D represents said diaphragm, $L_1$ to $L_6$ deisgnates the lens of said eyepiece, $r_1$ to $r_{11}$ designates the radii of curvature of surfaces of said diaphragm and the respective lenses, the number of different radii for the entire eyepiece being only eight, $d_1$ to $d_6$ designates the axial thicknesses of said respective lenses, $l_1$ to $l_4$ designates the axial air space thicknesses between respective elements, $n_1$ to $n_6$ designates the indices of refraction of said respective lenses, $V_1$ to $V_6$ designates the Abbe dispersion numbers of said respective lenses and $C.A._1$ to $C.A._6$ designates the clear apertures of the respective lenses and $C.A._D$ designates the clear aperture of said diaphragm,

| Element | Radii | Axial Thicknesses | Air Space Thicknesses | $n_d$ | V | C.A. |
|---|---|---|---|---|---|---|
| D | $r_1 = \infty$ | | $l_1 = .326$ | | | $C.A._D = 1.568$ |
| $L_1, L_2$ | $r_2 = -1.875$ | $d_1 = .133$ | | $n_1 = 1.649$ | $V_1 = 33.8$ | $C.A._1 = 1.446$ |
| | $r_3 = +1.875$ | $d_2 = .639$ | | $n_2 = 1.620$ | $V_2 = 60.3$ | |
| | $r_4 = 1.875$ | | $l_2 = .009$ | | | $C.A._2 = 1.792$ |
| $L_3$ | $r_5 = +4.766$ | $d_3 = .337$ | | $n_3 = 1.620$ | $V_3 = 60.3$ | $C.A._3 = 1.858$ |
| | $r_6 = -4.766$ | | $l_3 = .009$ | | | |
| $L_4$ | $r_7 = +1.875$ | $d_4 = .399$ | | $n_4 = 1.620$ | $V_4 = 60.3$ | $C.A._4 = 1.758$ |
| | $r_8 = \infty$ | | $l_4 = .009$ | | | |
| $L_5, L_6$ | $r_9 = +1.346$ | $d_5 = .461$ | | $n_5 = 1.620$ | $V_5 = 60.3$ | $C.A._5 = 1.436$ |
| | $r_{10} = -2.018$ | $d_6 = .107$ | | $n_6 = 1.649$ | $V_6 = 33.8$ | |
| | $r_{11} = +2.808$ | | | | | $C.A._6 = 1.001$ |

Equivalent focal length, $F = 1.000''$, $f_{1 \text{ and } 2} = 39.9F$, $f_3 = 3.90F$, $f_4 = 3.02F$, $f_{5 \text{ and } 6} = 3.93F$.

No references cited.

JOHN K. CORBIN, *Primary Examiner*.